(12) United States Patent
Nadamoto et al.

(10) Patent No.: US 10,554,891 B2
(45) Date of Patent: Feb. 4, 2020

(54) IMAGE STABILIZATION APPARATUS, IMAGE STABILIZATION METHOD, IMAGE CAPTURING APPARATUS, IMAGE CAPTURING SYSTEM AND NON-TRANSITORY STORAGE MEDIUM

(71) Applicant: CANON KABUSHIKI KAISHA, Tokyo (JP)

(72) Inventors: Ken Nadamoto, Utsunomiya (JP); Wataru Takayanagi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/958,041

(22) Filed: Apr. 20, 2018

(65) Prior Publication Data

US 2018/0309932 A1    Oct. 25, 2018

(30) Foreign Application Priority Data

Apr. 25, 2017  (JP) ................................ 2017-086546

(51) Int. Cl.
*H04N 5/232* (2006.01)
*H04N 5/225* (2006.01)

(52) U.S. Cl.
CPC ..... *H04N 5/23267* (2013.01); *H04N 5/23254* (2013.01); *H04N 5/23258* (2013.01); *H04N 5/23287* (2013.01); *H04N 5/23212* (2013.01); *H04N 5/23251* (2013.01)

(58) Field of Classification Search
CPC ........... H04N 5/23209; H04N 2/23251; H04N 5/23258; H04N 5/23261; H04N 5/23264; H04N 5/23267; H04N 5/23274; H04N 5/23254; H04N 5/23287; H04N 5/23212
See application file for complete search history.

(56) References Cited

U.S. PATENT DOCUMENTS

| | | | |
|---|---|---|---|
| 9,007,468 B2 * | 4/2015 | Washisu | G03B 5/00 348/208.2 |
| 9,374,531 B2 * | 6/2016 | Wakamatsu | H04N 5/23267 |
| 9,860,457 B2 * | 1/2018 | Ota | H04N 5/2628 |
| 9,883,104 B2 * | 1/2018 | Wakamatsu | H04N 5/23248 |
| 10,136,064 B2 * | 11/2018 | Noguchi | H04N 5/23264 |

(Continued)

FOREIGN PATENT DOCUMENTS

JP   2011-071786 A   4/2011

*Primary Examiner* — Ngoc Yen T Vu
(74) *Attorney, Agent, or Firm* — Cowan, Liebowitz & Latman, P.C.

(57) ABSTRACT

An image stabilization apparatus comprising: an image stabilization unit that performs image stabilization by changing a crop position at which part of image is cropped from an image obtained by photoelectric conversion of an optical image formed through a detachable lens unit by an image sensor based on a vibration amount detected by a vibration detection unit; a control unit that controls the image stabilization unit so as to shift the crop position by a predetermined swing back amount toward a center of the image; and a determination unit that determines whether or not zooming is performed based on focal lengths obtained from the lens unit at a predetermined time interval, wherein the control unit increases the swing back amount in a case where zooming is performed than in a case where zooming is not performed.

10 Claims, 6 Drawing Sheets

(56) References Cited

U.S. PATENT DOCUMENTS

| | | | |
|---|---|---|---|
| 10,186,021 B2* | 1/2019 | Koyano | G02B 7/09 |
| 2017/0163879 A1* | 6/2017 | Tsuji | H04N 5/23216 |
| 2018/0167558 A1* | 6/2018 | Hirai | H04N 5/23254 |

* cited by examiner

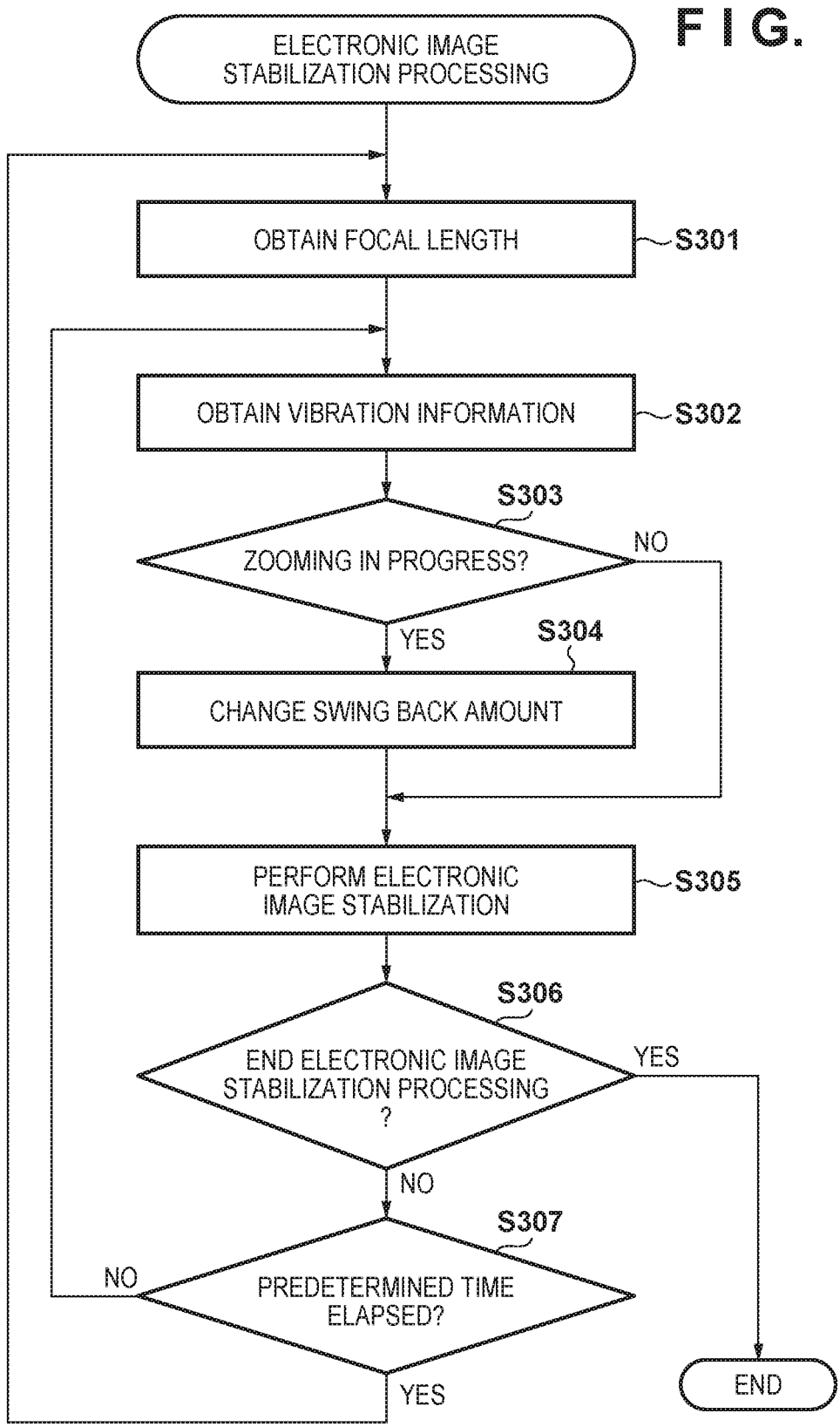

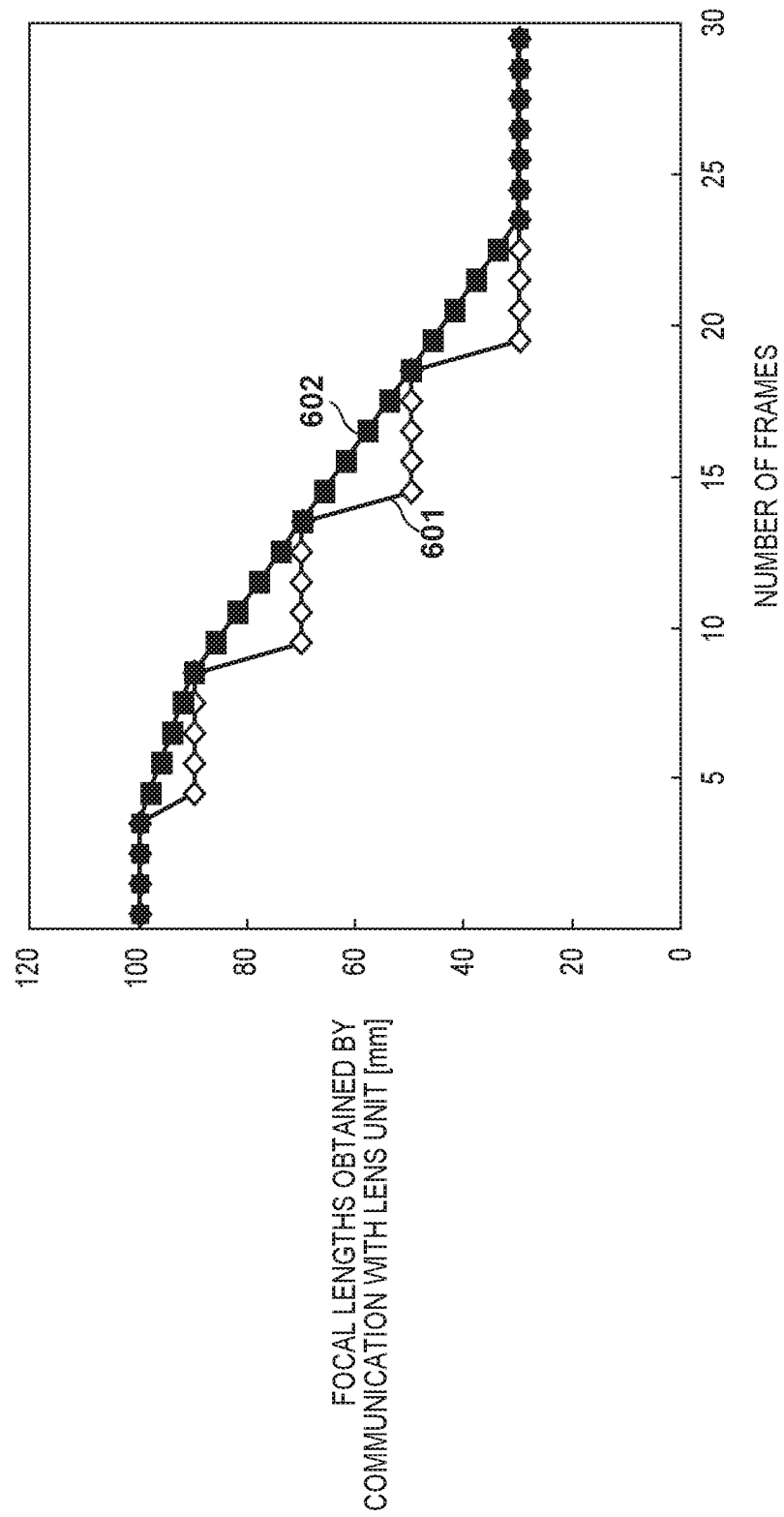

IMAGE STABILIZATION APPARATUS, IMAGE STABILIZATION METHOD, IMAGE CAPTURING APPARATUS, IMAGE CAPTURING SYSTEM AND NON-TRANSITORY STORAGE MEDIUM

BACKGROUND OF THE INVENTION

Field of the Invention

The present invention relates to an images stabilization apparatus, image stabilization method, an image capturing apparatus, an image capturing system and a non-transitory storage medium, and more particularly, to a technique for reducing an unnatural motion in a moving image caused by electronic image stabilization in an image capturing system including a lens unit and an image capturing apparatus that communicate with each other.

Description of the Related Art

There is a technique of detecting vibration or the like applied to the image capturing apparatus and correcting image blur caused by vibration. As a technique of image stabilization, there is optical image stabilization which drives an optical lens so as to cancel vibration in accordance with the detected vibration, and corrects image blur. Furthermore, in recent years, there is a sensor image stabilization that corrects image blur by driving an image sensor so as to cancel vibration in accordance with the detected vibration. There is also electronic image stabilization that corrects image blur by cropping a part of successive images captured by an image sensor in accordance with detected vibration and performing projective transformation.

Further, the method of detecting vibration includes a method of detecting vibration of the image capturing apparatus itself by an angular velocity sensor or an acceleration sensor and a motion vector method of performing predictive calculation on vibration of the image capturing apparatus from an amount of motion vector between successive images captured by the image sensor.

In the electronic image stabilization, there is a swing back process in which the crop position is gradually returned to the center in order to alleviate the crop position hitting the correction edge when cropping the image. Japanese Patent Laid-Open No. 2011-71786 proposes a method of suppressing degradation of accuracy due to erroneous detection of a motion vector caused by a swing back process in the electronic image stabilization.

In the lens interchangeable camera system, communication is performed between the camera and the lens at predetermined time intervals to inform the camera body of the focal length of the lens. When the lens interchangeable camera system is placed on a tripod and the electronic image stabilization function is enabled and panning is performed from that state, the crop position of the electronic image stabilization deviates from the center. Then, when the optical zoom is performed after the panning is stopped, since the camera body updates the focal length information only at predetermined time interval when the focal length information is obtained through the communication with the lens, there is a problem in which the swing back process that attempts to bring back the crop position deviated from the center to the center becomes conspicuous as an unnatural movement of a moving image.

SUMMARY OF THE INVENTION

The present invention has been made in consideration of the above situation, and suppresses a phenomenon that a swing back process during zooming appears as an unnatural movement of an image due to the electronic image stabilization in a lens interchangeable camera system.

According to the present invention, provided is an image stabilization apparatus comprising: an image stabilization unit that performs image stabilization by changing a crop position at which part of image is cropped from an image obtained by photoelectric conversion of an optical image formed through a detachable lens unit by an image sensor based on a vibration amount detected by a vibration detection unit; a control unit that controls the image stabilization unit so as to shift the crop position by a predetermined swing back amount toward a center of the image; and a determination unit that determines whether or not zooming is performed based on focal lengths obtained from the lens unit at a predetermined time interval, wherein the control unit increases the swing back amount in a case where zooming is performed than in a case where zooming is not performed.

Further, according to the present invention, provided is an image stabilization apparatus comprising: an image stabilization unit that performs image stabilization by changing a crop position at which part of image is cropped from an image obtained by photoelectric conversion of an optical image formed through a detachable lens unit by an image sensor based on a vibration amount detected by a vibration detection unit; a control unit that controls the image stabilization unit so as to shift the crop position by a predetermined swing back amount toward a center of the image; and a determination unit that determines whether or not zooming is performed based on focal lengths obtained from the lens unit at a predetermined time interval, wherein let a distance between positions on a sensor surface of the image sensor corresponding to a center of the image and a center of the crop position be $\delta$, the focal length be f, and an angle [rad] at the position on the sensor surface of the image sensor corresponding to the center of the crop position with respect to a central axis orthogonal to the sensor surface be $\theta$, when relationship is expressed by $$\delta = \theta \times f,$$

and if a change amount of the angle $\theta$ in a predetermined period is constant, then the control unit disperses a difference between focal lengths obtained at the predetermined time interval so that the change amount of the focal length in the predetermined period becomes constant in a case where zooming is performed.

Furthermore, according to the present invention, provided is an image capturing apparatus comprising: an image sensor; and an image stabilization apparatus comprising: an image stabilization unit that performs image stabilization by changing a crop position at which part of image is cropped from an image obtained by photoelectric conversion of an optical image formed through a detachable lens unit by the image sensor based on a vibration amount detected by a vibration detection unit; a control unit that controls the image stabilization unit so as to shift the crop position by a predetermined swing back amount toward a center of the image; and a determination unit that determines whether or not zooming is performed based on focal lengths obtained from the lens unit at a predetermined time interval, wherein the control unit increases the swing back amount in a case where zooming is performed than in a case where zooming is not performed, and wherein the lens unit is detachable from the image capturing apparatus.

Further, according to the present invention, provided is an image capturing apparatus comprising: an image sensor; and an image stabilization apparatus comprising: an image stabilization unit that performs image stabilization by changing a crop position at which part of image is cropped from an image obtained by photoelectric conversion of an optical image formed through a detachable lens unit by the image sensor based on a vibration amount detected by a vibration detection unit; a control unit that controls the image stabilization unit so as to shift the crop position by a predetermined swing back amount toward a center of the image; and a determination unit that determines whether or not zooming is performed based on focal lengths obtained from the lens unit at a predetermined time interval, wherein let a distance between positions on a sensor surface of the image sensor corresponding to a center of the image and a center of the crop position be δ, the focal length be f, and an angle [rad] at the position on the sensor surface of the image sensor corresponding to the center of the crop position with respect to a central axis orthogonal to the sensor surface be θ, when relationship is expressed by $$\delta = \theta \times f,$$

and if a change amount of the angle θ in a predetermined period is constant, then the control unit disperses a difference between focal lengths obtained at the predetermined time interval so that the change amount of the focal length in the predetermined period becomes constant in a case where zooming is performed, and wherein the lens unit is detachable from the image capturing apparatus.

Further, according to the present invention, provided is an image capturing system comprising: a lens unit that is detachable from an image capturing apparatus; and the image capturing apparatus comprising: an image sensor; and an image stabilization apparatus comprising: an image stabilization unit that performs image stabilization by changing a crop position at which part of image is cropped from an image obtained by photoelectric conversion of an optical image formed through the lens unit by an image sensor based on a vibration amount detected by a vibration detection unit; a control unit that controls the image stabilization unit so as to shift the crop position by a predetermined swing back amount toward a center of the image; and a determination unit that determines whether or not zooming is performed based on focal lengths obtained from the lens unit at a predetermined time interval; and wherein the control unit increases the swing back amount in a case where zooming is performed than in a case where zooming is not performed.

Further, according to the present invention, provided is an image capturing system comprising: a lens unit that is detachable from an image capturing apparatus; and the image capturing apparatus comprising: an image sensor; and an image stabilization apparatus comprising: an image stabilization unit that performs image stabilization by changing a crop position at which part of image is cropped from an image obtained by photoelectric conversion of an optical image formed through the lens unit by the image sensor based on a vibration amount detected by a vibration detection unit; a control unit that controls the image stabilization unit so as to shift the crop position by a predetermined swing back amount toward a center of the image; and a determination unit that determines whether or not zooming is performed based on focal lengths obtained from the lens unit at a predetermined time interval, wherein let a distance between positions on a sensor surface of the image sensor corresponding to a center of the image and a center of the crop position be δ, the focal length be f, and an angle [rad] at the position on the sensor surface of the image sensor corresponding to the center of the crop position with respect to a central axis orthogonal to the sensor surface be θ, when relationship is expressed by $$\delta = \theta \times f,$$

and if a change amount of the angle θ in a predetermined period is constant, then the control unit disperses a difference between focal lengths obtained at the predetermined time interval so that the change amount of the focal length in the predetermined period becomes constant in a case where zooming is performed.

Further, according to the present invention, provided is an image stabilization method comprising: performing image stabilization by changing a crop position at which part of image is cropped from an image obtained by photoelectric conversion of an optical image formed through a detachable lens unit by an image sensor based on a vibration amount detected by a vibration detection unit; controlling the image stabilization so as to shift the crop position by a predetermined swing back amount toward a center of the image; and determining whether or not zooming is performed based on focal lengths obtained from the lens unit at a predetermined time interval, wherein the swing back amount is set larger in a case where zooming is performed than in a case where zooming is not performed.

Further, according to the present invention, provided is an image stabilization method comprising: performing image stabilization by changing a crop position at which part of image is cropped from an image obtained by photoelectric conversion of an optical image formed through a detachable lens unit by an image sensor based on a vibration amount detected by a vibration detection unit; controlling the image stabilization so as to shift the crop position by a predetermined swing back amount toward a center of the image; and determining whether or not zooming is performed based on focal lengths obtained from the lens unit at a predetermined time interval, wherein let a distance between positions on a sensor surface of the image sensor corresponding to a center of the image and a center of the crop position be δ, the focal length be f, and an angle [rad] at the position on the sensor surface of the image sensor corresponding to the center of the crop position with respect to a central axis orthogonal to the sensor surface be θ, when relationship is expressed by $$\delta = \theta \times f,$$

and if a change amount of the angle θ in a predetermined period is constant, then a difference between focal lengths obtained at the predetermined time interval is dispersed so that the change amount of the focal length in the predetermined period becomes constant in a case where zooming is performed.

Further, according to the present invention, provided is a non-transitory storage medium readable by a computer, the storage medium storing a program that is executable by the computer, wherein the program includes program code for causing the computer to realize an image stabilization method comprising: performing image stabilization by changing a crop position at which part of image is cropped from an image obtained by photoelectric conversion of an optical image formed through a detachable lens unit by an image sensor based on a vibration amount detected by a vibration detection unit; controlling the image stabilization so as to shift the crop position by a predetermined swing back amount toward a center of the image; and determining whether or not zooming is performed based on focal lengths obtained from the lens unit at a predetermined time interval, wherein the swing back amount is set larger in a case where zooming is performed than in a case where zooming is not performed.

Further, according to the present invention, provided is a non-transitory storage medium readable by a computer, the storage medium storing a program that is executable by the computer, wherein the program includes program code for causing the computer to realize an image stabilization method comprising: performing image stabilization by changing a crop position at which part of image is cropped from an image obtained by photoelectric conversion of an optical image formed through a detachable lens unit by an image sensor based on a vibration amount detected by a vibration detection unit; controlling the image stabilization so as to shift the crop position by a predetermined swing back amount toward a center of the image; and determining whether or not zooming is performed based on focal lengths obtained from the lens unit at a predetermined time interval, wherein let a distance between positions on a sensor surface of the image sensor corresponding to a center of the image and a center of the crop position be δ, the focal length be f, and an angle [rad] at the position on the sensor surface of the image sensor corresponding to the center of the crop position with respect to a central axis orthogonal to the sensor surface be θ, when relationship is expressed by $$\delta = \theta \times f,$$

and if a change amount of the angle θ in a predetermined period is constant, then a difference between focal lengths obtained at the predetermined time interval is dispersed so that the change amount of the focal length in the predetermined period becomes constant in a case where zooming is performed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart showing a swing back process performed in electronic image stabilization processing according to the first and second embodiments;

FIG. 6 is a diagram showing temporal transition of a focal length used for the swing back process according to the third embodiment.

DESCRIPTION OF THE EMBODIMENTS

Exemplary embodiments of the present invention will be described in detail in accordance with the accompanying drawings. First, items common to the respective embodiments will be described.

Figure 1:
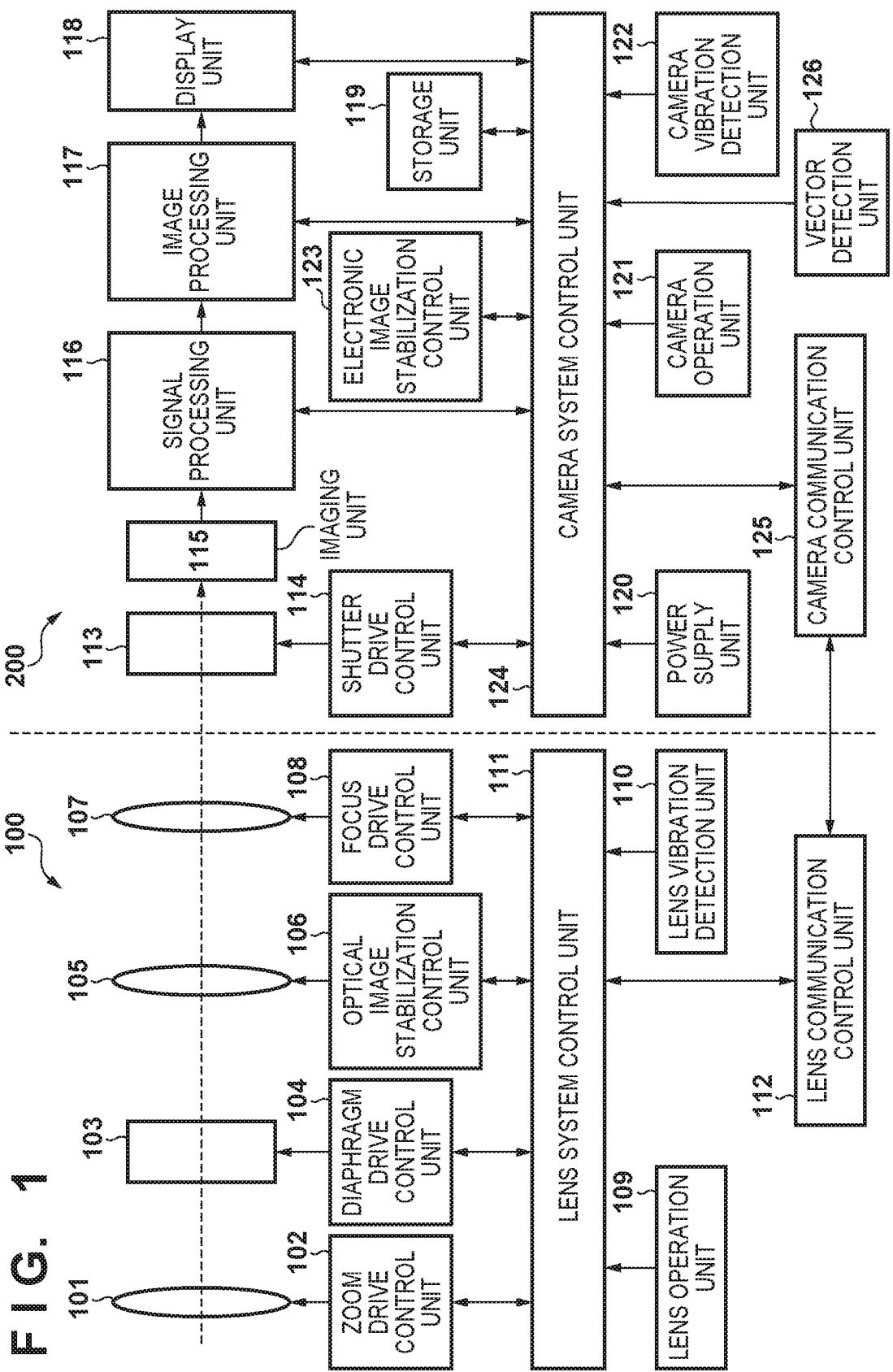
FIG. 1 is a block diagram illustrating an example of a configuration of an image capturing system according to an embodiment of the present invention.

FIG. 1 is a block diagram showing a configuration of an image capturing system according to an embodiment of the present invention. As an example, the image capturing system according to the present embodiment is a lens interchangeable digital camera mainly for capturing still images and moving images. It should be noted that the present invention can be applied not only to a digital camera, but also to various image capturing systems.

The image capturing system shown in FIG. 1 is composed of a detachable lens unit 100 and a camera main body 200, and the lens unit 100 is mounted on the camera main body 200 for use. A zoom unit 101 of the lens unit 100 includes a zoom lens used for zooming and is driven and controlled by a zoom drive control unit 102. A diaphragm unit 103 has a function of a diaphragm, and is driven and controlled by a diaphragm drive control unit 104. An image stabilization unit 105 includes an vibration correction lens (hereinafter also referred to as "correction lens") such as a shift lens and is driven and controlled by an optical image stabilization control unit 106. A focus unit 107 includes a focus lens that is used for focus adjustment and forms a subject image, and is driven and controlled by a focus drive control unit 108.

A lens operation unit 109 is an operation unit used by a user to operate the lens unit 100. A lens vibration detection unit 110 detects a vibration amount applied to the lens unit 100 and outputs a detection signal to a lens system control unit 111. The lens system control unit 111 that controls the entire lens unit 100 includes a CPU (Central Processing Unit), and totally controls each drive control unit and correction control unit of the lens unit 100. The lens system control unit 111 communicates with a control unit of the camera main body 200 via a lens communication control unit 112.

Next, the camera main body 200 will be described. The camera main body 200 includes a shutter unit 113, and the shutter unit 113 is driven and controlled by a shutter drive control unit 114. An imaging unit 115 includes an image sensor, photoelectrically converts an optical image formed through the lens group, and outputs an electric signal. A signal processing unit 116 converts the electric signal output from the imaging unit 115 into a video signal. An image processing unit 117 processes the video signal output from the signal processing unit 116 according to the application. For example, the image processing unit 117 changes a crop position of the video signal according to a correction amount of an electronic image stabilization control unit 123, and controls the image stabilization processing by cutting out the image.

A display unit 118 displays an image as necessary based on the signal output from the image processing unit 117. A storage unit 119 stores various data such as image information. A power supply unit 120 supplies power to the entire system according to the application. A camera operation unit 121 is an operation unit used by a user to operate the camera system, and outputs an operation signal to a camera system control unit 124. A camera vibration detection unit 122 and a vector detection unit 126 detect a vibration amount applied to the camera and output detection signals to the camera system control unit 124. The camera system control unit 124 has a CPU and controls the entire camera system. The camera system control unit 124 communicates with the lens communication control unit 112 of the lens unit 100 via a camera communication control unit 125. That is, in a state in which the lens unit 100 is attached to the camera main body 200 and is electrically connected, mutual communication is performed by the lens communication control unit 112 and the camera communication control unit 125.

Next, an outline of the operation of the image capturing system having the above configuration will be described. The lens operation unit 109 and the camera operation unit 121 include an image stabilization ON/OFF switches that can select ON/OFF of image stabilization processing. When the user operates the image stabilization ON/OFF switch to select ON of the image stabilization processing, the lens system control unit 111 or the camera system control unit 124 instructs the optical image stabilization control unit 106 and/or the electronic image stabilization control unit 123 to perform image stabilization processing. Each image stabilization control unit controls the image stabilization processing until an OFF instruction of the image stabilization processing is issued.

The camera operation unit 121 also includes an image stabilization mode switch capable of selecting one of the first to third modes with respect to image stabilization processing. The first mode is a mode in which the image stabilization processing is performed only by optical image stabilization processing. The second mode is a mode in which the image stabilization processing is performed by using both of the optical image stabilization processing and electronic image stabilization processing. The third mode is a mode in which the image stabilization processing is performed only by the electronic image stabilization processing.

The camera operation unit 121 includes a shutter release button configured to sequentially turn on a first switch (SW1) and a second switch (SW2) according to a push amount. The first switch SW1 turns on when a user presses the shutter release button about halfway, and the second switch SW2 turns on when the user fully presses the shutter release button. When the first switch SW1 is turned on, the focus drive control unit 108 drives the focus unit 107 to perform focus adjustment, and the diaphragm drive control unit 104 drives the diaphragm unit 103 to set the exposure amount to an appropriate value. When the second switch SW2 is turned on, image data obtained from a light image exposed to the imaging unit 115 is stored in the storage unit 119.

The camera operation unit 121 also includes a moving image recording switch. The camera starts moving image shooting when the moving image recording switch is pressed, and when the user presses the moving image recording switch again while recording, the recording is ended. When the user operates the shutter release button and the first switch SW1 and the second switch SW2 are turned on during the moving image shooting, a process of acquiring and recording a still image during moving image recording is executed. The camera operation unit 121 further includes a playback mode selection switch capable of selecting a playback mode. When the playback mode is selected by operating the playback mode selection switch, the camera stops the image stabilization processing operation.

Figure 2:
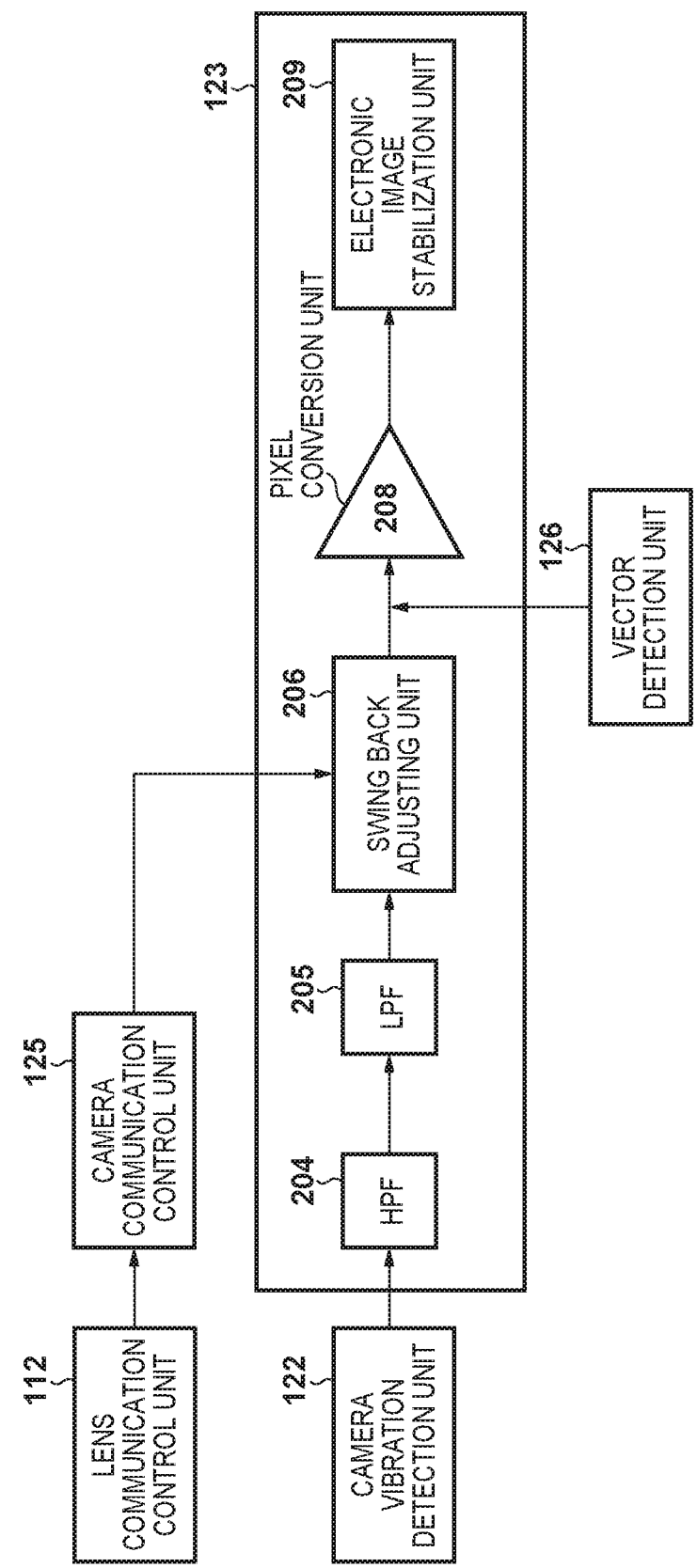
FIG. 2 is a block diagram showing a functional configuration of an electronic image stabilization control unit according to the embodiment.

FIG. 2 is a block diagram showing a functional configuration of the electronic image stabilization control unit 123. Signals from the camera communication control unit 125, the camera vibration detection unit 122, and the vector detection unit 126 are input via the camera system control unit 124. In FIG. 2, in order to simplify the drawing, it is expressed that signals are directly input to the electronic image stabilization control unit 123.

The lens communication control unit 112 transmits the focal length of the lens unit 100 to a swing back adjusting unit 206 via the camera communication control unit 125. The camera vibration detection unit 122 detects camera vibration by a gyro sensor or the like, and outputs a detection signal to a high-pass filter 204. The high-pass filter 204 removes offset and drift components of the detection signal, and outputs the result to a low-pass filter 205. The low-pass filter 205 cuts off high-frequency noise of the detection signal and outputs the result to the swing back adjusting unit 206.

In the swing back adjusting unit 206, a swing back amount is added to an electronic image stabilization amount based on the focal length of the lens unit 100. In the swing back process, in a case where the center position (hereinafter referred to as "image crop position") of the image to be cropped deviates from the center of the captured image, the angle between the central axis orthogonal to the sensor surface of the image sensor and an axis at the image crop position orthogonal to the image to be cropped is gradually reduced, thereby the image crop position is gradually moved toward the center of the image to be cropped and finally returned to the center. At this time, the distance δ between the center of the captured image and the position corresponding to the image crop position on the sensor surface of the image sensor is expressed by the following equation (1), namely by a product of the angle with respect to the central axis of the sensor surface and the focal length.

$$\delta = \theta \times f \quad (1)$$

δ: distance from the center of an image to the image crop position
f: focal length
θ: an angle [rad] of the image crop position with respect to the central axis orthogonal to the sensor surface Therefore, in the swing back process, let the angle at the start of the swing back be $\theta_0$, and an amount of swing back per frame period be $\Delta\theta$[rad], the image crop position $\delta_i$ from the image of the i-th frame can be expressed as $$\delta_i = (\theta_0 - \Delta\theta \times i) \times f \quad (2)$$

That is, after $\theta/\Delta\theta$ frames, the image crop position returns to the position of the central axis.

The vibration amount detected by the vector detection unit 126 but not detected by the camera vibration detection unit 122 is added to the electronic image stabilization amount obtained by the swing back adjusting unit 206, and the added result is output to a pixel conversion unit 208. The Pixel conversion unit 206 converts the added result to a pixel amount (converts to the number of pixels) and outputs it to an electronic image stabilization unit 209. The electronic image stabilization unit 209 performs projective conversion on the image according to the electronic image stabilization amount and outputs an image in which the vibration is suppressed.

As described above, the camera main body 200 receives the focal length information of the lens unit 100 via the lens communication control unit 112 at constant time intervals according to the communication interval with the lens unit 100, and updates the information. Therefore, if optical zooming is performed during the swing back process, the focal length information obtained by the camera main body 200 changes discontinuously, so that the change in the image crop position also becomes discontinuous, which results in unnatural movement of a moving image.

First Embodiment

A first embodiment of the present invention will be described below. In the first embodiment, the swing back process performed by the swing back adjusting unit 206 of the electronic image stabilization control unit 123 will be described in detail with reference to FIG. 3. It should be noted that the processing described below is carried out when electronic image stabilization is performed in a case where the second mode or the third mode is selected.

When the electronic image stabilization processing starts, first in step S301, the focal length of the lens unit 100 is acquired. Since the communication with the lens unit 100 is performed only at regular time intervals as described above, the focal length of the lens unit 100 obtained here is used in the swing back process explained below until the focal length is acquired next time. Then, in step S302, vibration information of the camera detected and calculated by the camera vibration detection unit 122 and the vector detection unit 126 is obtained.

Next, in step S303, it is determined based on the history of the focal length acquired in step S301 whether or not zooming is in progress. If zooming is in progress, in step S304, the swing back amount Δθ at the non-zooming time is multiplied by a coefficient k (k>1) to increase the swing back amount (=Δθ×k). If zooming is not in progress, the process directly proceeds to step S305 without changing the swing back amount. In this way, in the case where zooming is in progress, after changing the swing back amount in step S304, image stabilization and swing back process are performed simultaneously in step S305. Finally, in step S306, it is judged whether electronic image stabilization is to be ended. If it is to be ended, the electronic image stabilization processing is ended. If it is not to be ended, in step S307, whether or not a predetermined time since the communication with the lens unit 100 was performed last time has elapsed. If it has not elapsed, since communication with the lens unit 100 is not performed anew, the electronic image stabilization processing is continued by repeating the process from step S302. On the other hand, if elapsed, the process returns to step S301, a focal length is acquired anew from the lens unit 100, and the above-described process is repeated.

Figure 4A:
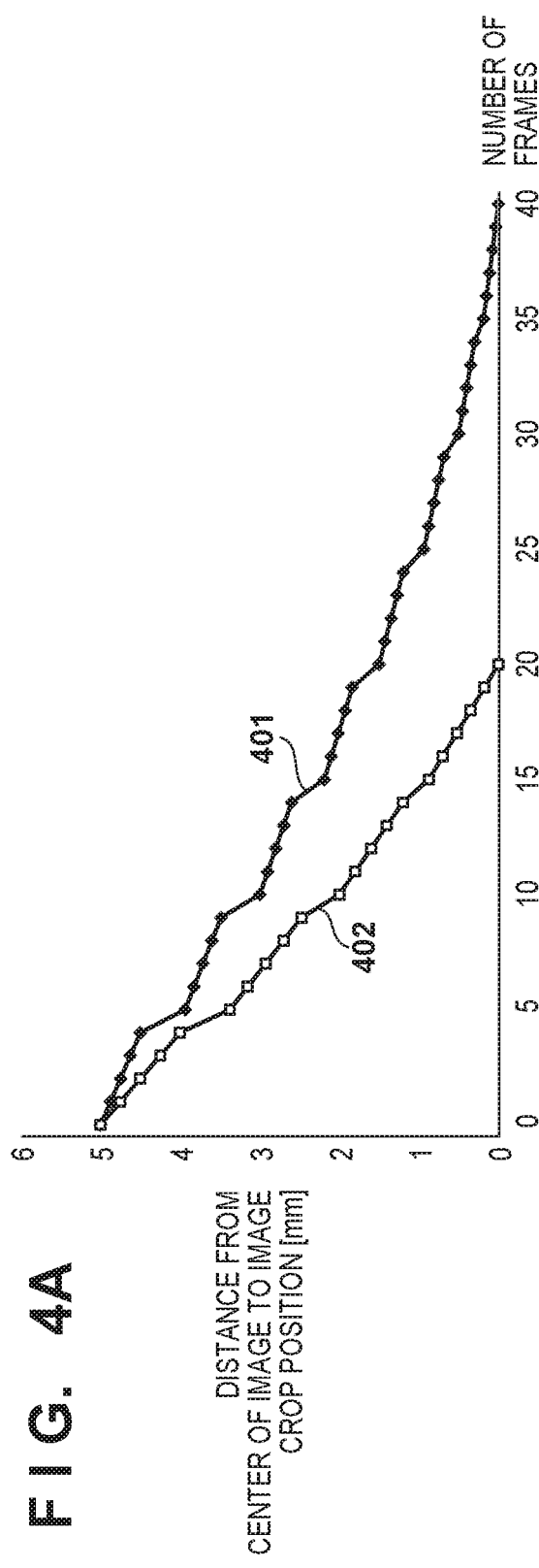
FIGS. 4A and 4B are diagrams showing temporal transition of distance from a center of an image to a crop position of the image in the swing back process.

Next, effects of the first embodiment will be described with reference to FIGS. 4A and 4B. FIG. 4A is a graph showing a change in crop position in an image at the time of zooming out (when the focal length is gradually shortened). FIG. 4A shows an example in which communication with the lens unit 100 is performed and the focal length is updated every five frames. A graph 401 shows the distance from the center of the sensor surface of the image pickup element to the image crop position when the swing back process is performed by a conventional method. Further, a graph 402 shows the distance from the center of the sensor surface to the image crop position in the case where the swing back process is performed by the method according to the first embodiment. Here, as an example, the coefficient k for multiplying the swing back amount Δθ is 2.

Figure 4B:
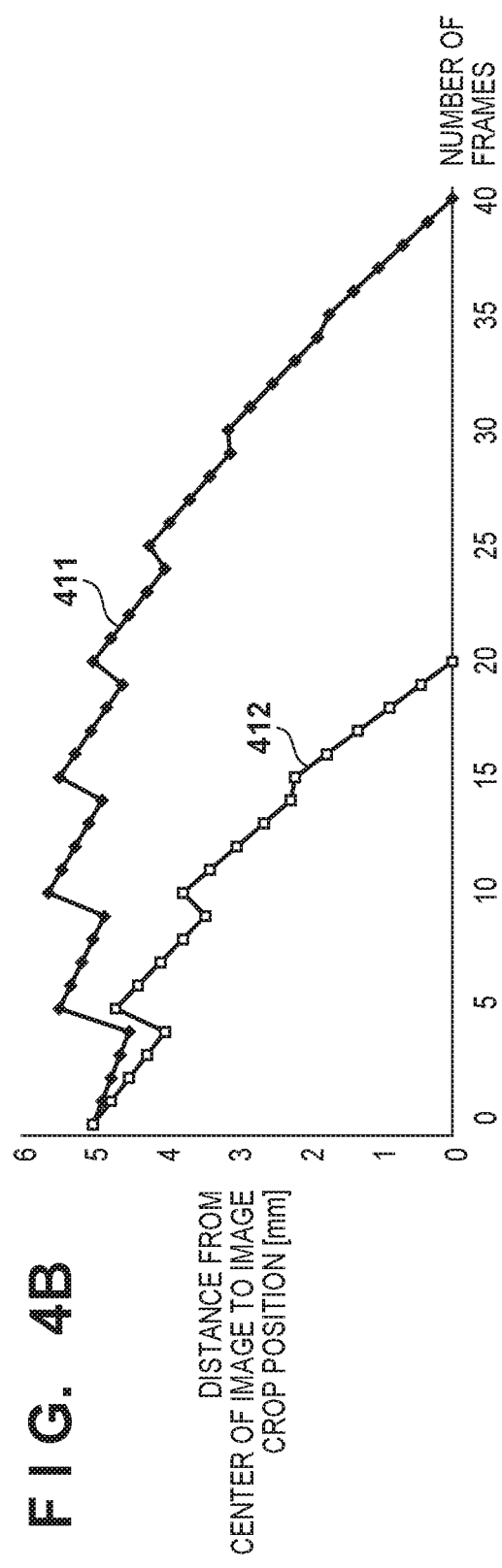

FIG. 4B is a graph showing a change in crop position in an image at the time of zooming in (when the focal length gradually becomes long), and similarly to FIG. 4A, the focal length is updated every 5 frames as in the case of FIG. 4A. A graph 411 shows the image crop position when the swing back process is performed by a conventional method and a graph 412 shows the image crop position when the swing back process is performed by the method according to the first embodiment. As an example, the coefficient k for multiplying the swing back amount Δθ is 2.

As can be seen from FIGS. 4A and 4B, in a case where the swing back process according to the first embodiment is performed during zooming, the change occurring every 5 frames becomes less conspicuous than the change according to the conventional example.

According to the first embodiment as described above, in the case where zooming is performed, by setting the swing back amount larger than in the case where zooming is not performed, it is possible to suppress an unnatural motion in a moving image.

Second Embodiment

Next, a second embodiment of the present invention will be described. The second embodiment is different from the first embodiment in the manner of changing the swing back amount. In the first embodiment, the swing back amount at the time of zooming is changed by multiplying the swing back amount Δθ at the time when zooming is not performed by a predetermined coefficient k larger than 1. On the other hand, in the second embodiment, the coefficient k at the time of zooming is changed depending upon zoom speed (change amount of the focal length) and a communication interval, thereby the swing back amount at the time of zooming is changed in S304 of FIG. 3. Since the second embodiment is the same as the first embodiment except for this point, other description is omitted.

In the second embodiment, in S304, zoom speed and a communication interval are calculated from the focal length information obtained in S301, and the coefficient k to multiply the swing back amount is changed based on the calculated values. When the communication interval with the lens is long or when the zoom speed is fast (when the change amount of the focal length is large), the amount of change in the focal length at the time of updating the focal length by communication with the lens increases. Therefore, in order to make this change less conspicuous, the coefficient k is set to a larger value than when the communication interval is short or the zoom speed is slow (when the change amount of the focal length is small).

According to the second embodiment as described above, it is possible to suppress an unnatural motion in a moving image in the swing back process more appropriately depending upon the zoom speed and the communication interval.

Third Embodiment

Next, a third embodiment of the present invention will be described. The third embodiment differs from the first and second embodiments in the manner of changing the swing back amount. In the first and second embodiments, the swing back amount at the time of zooming is changed by multiplying the rocking amount Δθ at the time when zooming is not performed by the coefficient k. On the other hand, in the third embodiment, at the time of zooming, the amount of change in the focal length when the focal length is updated by communication with the lens is dispersed into the frames up to the next communication with the lens, and the focal length for a period of time of each frame is determined.

Figure 5:
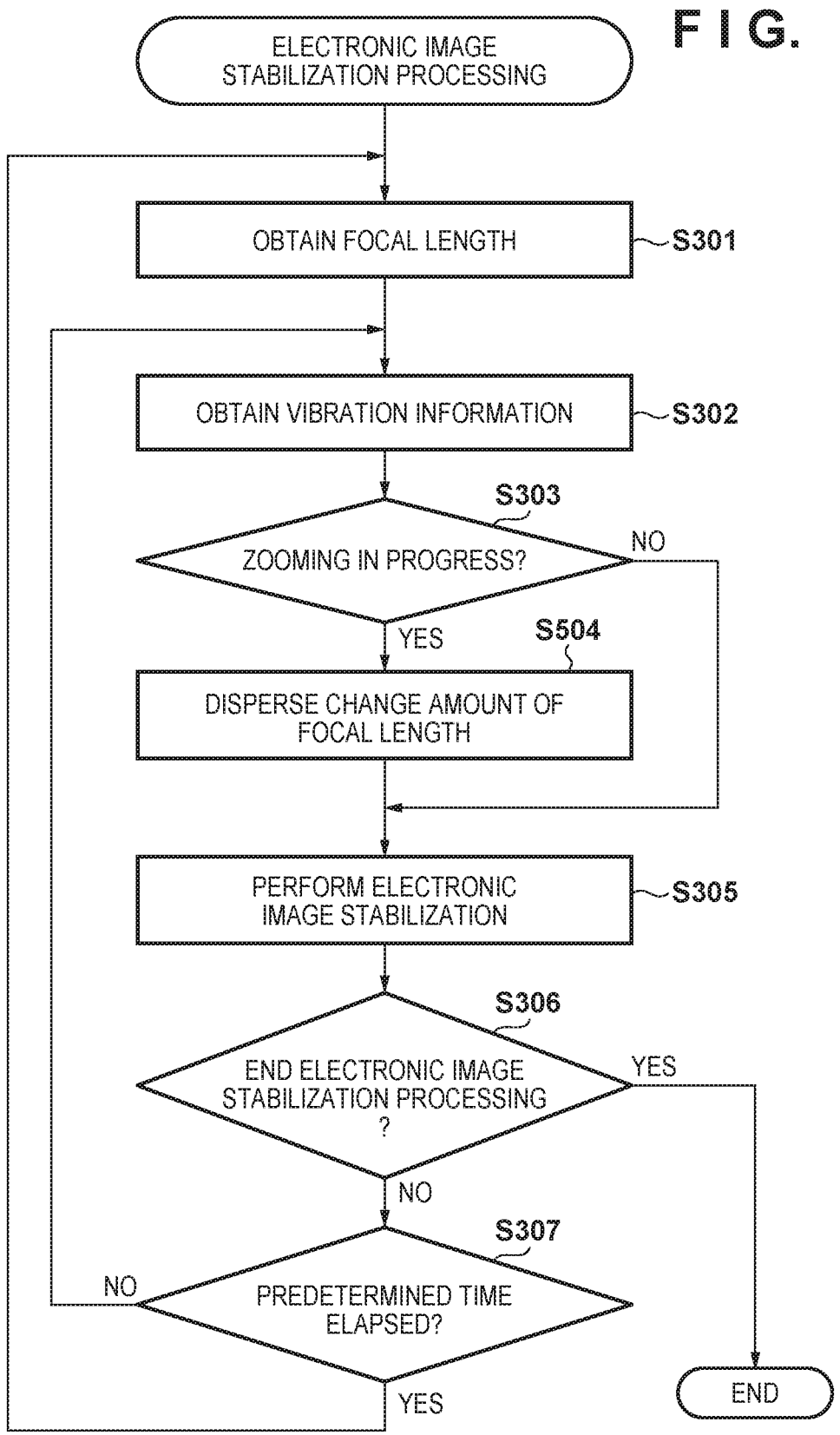
FIG. 5 is a flowchart showing a swing back process performed in electronic image stabilization processing according to a third embodiment.

FIG. 5 is a flowchart showing a swing back process performed by the swing back adjusting unit 206 of the electronic image stabilization control unit 123 in the third embodiment. In FIG. 5, the same reference numerals are given to the same processes as those in FIG. 3, and the description thereof will be omitted.

In the third embodiment, in step S504, a value obtained by dividing the change amount Δf between the previously acquired focal length and the currently acquired focal length by the number of frames corresponding to the communication interval is subtracted (when zooming out) or added (when zooming in) from/to the currently acquired focal length. FIG. 6 is a diagram showing the focal length used in the swing back process. A graph 601 shows the focal lengths used in the conventional method, and the graph 602 shows the focal lengths used in the third embodiment.

In the graph 601, when the communication with the lens is performed, the focal length greatly changes. On the other hand, in the graph 602, as described above, the change amount of the focal length when the communication with the lens is performed is dispersed into frames until the next communication with the lens is performed. For example, it is assumed that the focal length acquired in the fifth frame differs by 25 mm compared with the previously obtained focal length. In this case, let the current focal length be fp, then the focal length f of the i-th frame is expressed as fp [mm]+5 [mm]×i [frame] since the change amount is dispersed into 5 frames.

As can be seen from FIG. 6, since the focal length continuously changes, the change of the image crop position also becomes continuous and it is possible to prevent unnatural motion in a moving image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-086546, filed on Apr. 25, 2017 which is hereby incorporated by reference herein in its entirety.

What is claimed is:

1. An image stabilization apparatus comprising:
an image stabilization unit that performs image stabilization by changing a crop position at which part of image is cropped from an image obtained by photoelectric conversion of an optical image formed through a detachable lens unit by an image sensor based on a vibration amount detected by a vibration detection unit;
a control unit that controls the image stabilization unit so as to shift the crop position by a predetermined swing back amount toward a center of the image; and
a determination unit that determines whether or not zooming is performed based on focal lengths obtained from the lens unit at a predetermined time interval,
wherein the control unit increases the swing back amount in a case where zooming is performed than in a case where zooming is not performed,
wherein let a distance between positions on a sensor surface of the image sensor corresponding to a center of the image and a center of the crop position be δ, the focal length be f, and an angle [rad] at the position on the sensor surface of the image sensor corresponding to the center of the crop position with respect to a central axis which is orthogonal to the sensor surface of the image sensor and corresponding to the center of the image be θ, when relationship is expressed by $$\delta = \theta \times f,$$

then the swing back amount is a change amount of the angle θ in a predetermined period; and
wherein each unit is implemented by one or more processors, circuitry or a combination thereof.

2. The image stabilization apparatus according to claim 1, wherein, in a case where zooming is performed, the control unit multiplies the change amount in a case where zooming is not performed by a predetermined coefficient k (k>1).

3. The image stabilization apparatus according to claim 1, wherein, in a case where zooming is performed, if the change amount of the focal length is a first change amount, the control unit obtains the change amount of the angle θ in a case where zooming is performed by multiplying the angle θ in a case where zooming is not performed by a larger coefficient k (k>1) than in a case where the change amount of the focal length is a second change amount which is smaller than the first change amount.

4. The image stabilization apparatus according to claim 1, wherein, in a case where zooming is performed, if a time interval for obtaining the focal length is a first time interval, the control unit obtains the change amount of the angle θ in a case where zooming is performed by multiplying the angle θ in a case where zooming is not performed by a larger coefficient k (k>1) than in a case where the time interval for obtaining the focal length is a second time interval which is shorter than the first time interval.

5. An image stabilization apparatus comprising:
an image stabilization unit that performs image stabilization by changing a crop position at which part of image is cropped from an image obtained by photoelectric conversion of an optical image formed through a detachable lens unit by an image sensor based on a vibration amount detected by a vibration detection unit;
a control unit that controls the image stabilization unit so as to shift the crop position by a predetermined swing back amount toward a center of the image; and
a determination unit that determines whether or not zooming is performed based on focal lengths obtained from the lens unit at a predetermined time interval,
wherein let a distance between positions on a sensor surface of the image sensor corresponding to a center of the image and a center of the crop position be δ the focal length be f, and an angle [rad] at the position on the sensor surface of the image sensor corresponding to the center of the crop position with respect to a central axis orthogonal to the sensor surface be θ, when relationship is expressed by $$\delta = \theta \times f,$$

and if a change amount of the angle θ in a predetermined period is constant, then the control unit disperses a difference between focal lengths obtained at the predetermined time interval so that the change amount of the focal length in the predetermined period becomes constant in a case where zooming is performed, and
  wherein each unit, except for the lens unit, is implemented by one or more processors, circuitry or a combination thereof.

6. An image capturing apparatus comprising:
an image sensor; and
an image stabilization apparatus comprising:
  an image stabilization unit that performs image stabilization by changing a crop position at which part of image is cropped from an image obtained by photoelectric conversion of an optical image formed through a detachable lens unit by the image sensor based on a vibration amount detected by a vibration detection unit;
  a control unit that controls the image stabilization unit so as to shift the crop position by a predetermined swing back amount toward a center of the image; and
  a determination unit that determines whether or not zooming is performed based on focal lengths obtained from the lens unit at a predetermined time interval,
  wherein the control unit increases the swing back amount in a case where zooming is performed than in a case where zooming is not performed,
  wherein the lens unit is detachable from the image capturing apparatus,
  wherein let a distance between positions on a sensor surface of the image sensor corresponding to a center of the image and a center of the crop position be δ, the focal length be f, and an angle [rad] at the position on the sensor surface of the image sensor corresponding to the center of the crop position with respect to a central axis which is orthogonal to the sensor surface of the image sensor and corresponding to the center of the image be θ, when relationship is expressed by $$\delta = \theta \times f,$$

then the swing back amount is a change amount of the angle θ in a predetermined period; and
  wherein each unit, except for the lens unit, is implemented by one or more processors, circuitry or a combination thereof.

7. An image capturing apparatus comprising:
an image sensor; and
an image stabilization apparatus comprising:
  an image stabilization unit that performs image stabilization by changing a crop position at which part of image is cropped from an image obtained by photoelectric conversion of an optical image formed through a detachable lens unit by the image sensor based on a vibration amount detected by a vibration detection unit;
  a control unit that controls the image stabilization unit so as to shift the crop position by a predetermined swing back amount toward a center of the image; and
  a determination unit that determines whether or not zooming is performed based on focal lengths obtained from the lens unit at a predetermined time interval,
  wherein let a distance between positions on a sensor surface of the image sensor corresponding to a center of the image and a center of the crop position be δ, the focal length be f, and an angle [rad] at the position on the sensor surface of the image sensor corresponding to the center of the crop position with respect to a central axis orthogonal to the sensor surface be θ, when relationship is expressed by $$\delta = \theta \times f,$$

and if a change amount of the angle θ in a predetermined period is constant, then the control unit disperses a difference between focal lengths obtained at the predetermined time interval so that the change amount of the focal length in the predetermined period becomes constant in a case where zooming is performed,
  wherein the lens unit is detachable from the image capturing apparatus, and
  wherein each unit, except for the lens unit, is implemented by one or more processors, circuitry or a combination thereof.

8. An image stabilization method comprising:
performing image stabilization by changing a crop position at which part of image is cropped from an image obtained by photoelectric conversion of an optical image formed through a detachable lens unit by an image sensor based on a vibration amount detected by a vibration detection unit;
controlling the image stabilization so as to shift the crop position by a predetermined swing back amount toward a center of the image; and
determining whether or not zooming is performed based on focal lengths obtained from the lens unit at a predetermined time interval,
wherein the swing back amount is set larger in a case where zooming is performed than in a case where zooming is not performed, and
wherein let a distance between positions on a sensor surface of the image sensor corresponding to a center of the image and a center of the crop position be δ, the focal length be f, and an angle [rad] at the position on the sensor surface of the image sensor corresponding to the center of the crop position with respect to a central axis which is orthogonal to the sensor surface of the image sensor and corresponding to the center of the image be θ, when relationship is expressed by $$\delta = \theta \times f,$$

then the swing back amount is a change amount of the angle θ in a predetermined period.

9. An image stabilization method comprising:
performing image stabilization by changing a crop position at which part of image is cropped from an image obtained by photoelectric conversion of an optical image formed through a detachable lens unit by an image sensor based on a vibration amount detected by a vibration detection unit;
controlling the image stabilization so as to shift the crop position by a predetermined swing back amount toward a center of the image; and
determining whether or not zooming is performed based on focal lengths obtained from the lens unit at a predetermined time interval, wherein let a distance between positions on a sensor surface of the image sensor corresponding to a center of the image and a center of the crop position be δ, the focal length be f, and an angle [rad] at the position on the sensor surface of the image sensor corresponding to the center of the crop position with respect to a central axis orthogonal to the sensor surface be θ, when relationship is expressed by δ=θ×f, and if a change amount of the angle θ in a predetermined period is constant, then a difference between focal lengths obtained at the predetermined time interval is dispersed so that the change amount of the focal length in the predetermined period becomes constant in a case where zooming is performed.

10. A non-transitory storage medium readable by a computer, the storage medium storing a program that is executable by the computer, wherein the program includes program code for causing the computer to realize an image stabilization method comprising:

performing image stabilization by changing a crop position at which part of image is cropped from an image obtained by photoelectric conversion of an optical image formed through a detachable lens unit by an image sensor based on a vibration amount detected by a vibration detection unit;

controlling the image stabilization so as to shift the crop position by a predetermined swing back amount toward a center of the image; and determining whether or not zooming is performed based on focal lengths obtained from the lens unit at a predetermined time interval, wherein let a distance between positions on a sensor surface of the image sensor corresponding to a center of the image and a center of the crop position be δ, the focal length be f, and an angle [rad] at the position on the sensor surface of the image sensor corresponding to the center of the crop position with respect to a central axis orthogonal to the sensor surface be θ, when relationship is expressed by δ=θ×f, and if a change amount of the angle θ in a predetermined period is constant, then a difference between focal lengths obtained at the predetermined time interval is dispersed so that the change amount of the focal length in the predetermined period becomes constant in a case where zooming is performed.

* * * * *